United States Patent
Laiho

(12) 
(10) Patent No.: US 6,721,560 B1
(45) Date of Patent: Apr. 13, 2004

(54) SIGNALLING OVER THE GS INTERFACE IN A MOBILE TELECOMMUNICATIONS NETWORK

(75) Inventor: Keijo Laiho, Kirkkonummi (FI)

(73) Assignee: Telefonaktiebolaget LM Ericsson, Stockholm (SE)

( * ) Notice: Subject to any disclaimer, the term of this patent is extended or adjusted under 35 U.S.C. 154(b) by 524 days.

(21) Appl. No.: 09/676,187

(22) Filed: Sep. 29, 2000

(30) Foreign Application Priority Data

Oct. 5, 1999 (GB) .............................. 9923378

(51) Int. Cl.[7] ................................ H04Q 7/20
(52) U.S. Cl. ............... 455/432.1; 455/433; 455/435.1; 455/456.1; 455/412.1; 455/413; 455/414.1
(58) Field of Search ............... 455/433, 432.1, 455/435.1, 456.1, 456.2, 403, 422, 412.1, 414.1, 426.1, 413

(56) References Cited

U.S. PATENT DOCUMENTS

| | | | | |
|---|---|---|---|---|
| 5,396,543 A | * | 3/1995 | Beeson et al. | 455/560 |
| 5,608,779 A | * | 3/1997 | Lev et al. | 455/436 |
| 6,081,723 A | * | 6/2000 | Mademann | 455/456.1 |
| 6,456,845 B1 | * | 9/2002 | Drum et al. | 455/424 |
| 6,463,055 B1 | * | 10/2002 | Lupien et al. | 370/353 |

FOREIGN PATENT DOCUMENTS

| | | |
|---|---|---|
| DE | 196 11 947 C1 | 6/1997 |
| WO | 98/32303 | 7/1998 |

OTHER PUBLICATIONS

Digital cellular telecommunications system (Phase 2 +); General Packet Radio Services (GPRS); Serving GPRS Support Node (SGSN)–Visitor Location Register (VLR); Gs interface layer 3 specification (GSM 09.18 version 7.1.0 Release 1998) ETSI Technical Specification TS 101 346, Aug. 1, 1999, pp. 1–52, Sophia Antipolis, France.

Granbohm, Håkan and Joakim Wiklund "GPRS—General Packet Radion Service" Ericsson Review, SE, Ericsson, No. 2, 1999, pp. 82–88, ISSN:0014–0171, Stockholm, Sweden.

* cited by examiner

*Primary Examiner*—Nay Maung
*Assistant Examiner*—Sujatha Sharma

(57) ABSTRACT

A method of sending BSSAP+ messages over a SGSN/VLR interface of a mobile telecommunications system, the method comprising incorporating into BSSAP+ messages, or appending thereto, an identifier which allows the messages to be associated with the transactions to which they relate. This may be achieved either by placing the BSSAP+ protocol layer over the TCAP layer whereby the TCAP Transaction ID provides the identifier or by modifying the BSSAP+ protocol to allow for inclusion of the identifier directly into the BSSAP+ messages.

7 Claims, 3 Drawing Sheets

SIGNALLING OVER THE GS INTERFACE IN A MOBILE TELECOMMUNICATIONS NETWORK

This application claims priority under 35 U.S.C. §§ 119 and/or 365 to 9923378.5 filed in United Kingdom on Oct. 5, 1999; the entire content of which is hereby incorporated by reference.

FIELD OF THE INVENTION

The present invention relates to signalling over the Gs interface in a GSM mobile telecommunications network and more particularly to the BSSAP+ protocol used to communicate over this interface.

BACKGROUND OF THE INVENTION

The Global System for Mobile communications (GSM) is a widely used mobile telecommunications system defined by the European Telecommunications Standards Institute (ETSI). However, the current GSM system has only a limited capacity to transmit data because it makes use of circuit switched channels. Circuit switched channels occupy large amounts of bandwidth and produce a bottleneck for data transmission.

ETSI has therefore specified an enhancement to GSM (GSM Phase 2) and which is known as the GSM Packet Radio Services (GPRS). GPRS is a packet switched technology which transmits user data in the form of packets. Packets are only sent when there is data to send, i.e. it is no longer necessary to allocate an entire channel to a single user and data channels may be shared between many users. This frees the data transmission bottleneck of GSM. FIG. 1 illustrates schematically a GSM Phase II network which includes a GPRS packet switched network 1 as well as a conventional GSM circuit switched network 2. The GPRS backbone 3 is coupled for example to the Internet 4 via a Gateway GPRS Support Node (GGSN) 5.

In the GPRS network, the gateway 6 between the GPRS backbone 3 and a Base Station Controller (BSC) 7 which is responsible for a given mobile subscriber 8 via a Base Transceiver Station (BTS) 9, is known as a Serving GPRS Support Node (SGSN). A SGSN 6 is in some ways analogous to a Mobile Switching Centre (MSC) 10 of the GSM network 2, in that a SGSN 6 deals with the registration of mobile subscribers as well as the initial routing of subscriber connections. As with the MSC 10, for roaming subscribers a SGSN 6 must in certain cases exchange information with a Visitor Location Register (VLR) 11 located in the GSM network 2 (the GSM network also having a Home Location Register (HLR) 12). The interface between a SGSN 6 and the VLR 11 (over an SS7 network 13—see below) is identified as the Gs interface. For this purpose ETSI has defined a protocol known as the Base Station System Application Protocol+(BSSAP+) and which is specified in ETSI recommendation's GSM 09.16 and GSM 09.18.

Signalling messages are typically transported between signalling points of a telecommunications system using a Signalling System No.7 (SS7) network 13. The protocol stack for SS7 is illustrated in FIG. 2 and comprises three Message Transfer Parts (MTP levels 1 to 3) and a Signalling Connections and Control Part (SCCP). The nature of the MTP layers will not be described in detail here other than to note that they perform routing and error correction roles amongst other things.

SS7 is used by a number of application and user parts such as an ISDN User Part (ISUP), a Telephony User Part (TUP), a Transaction Capabilities Application Part (TCAP), and the BSSAP+ protocol. BSSAP+ (like TCAP) makes use of SS7 via the SCCP. A role of the SCCP is to provide subsystem numbers to allow messages to be addressed to specific applications (called subsystems) at network signalling points.

FIG. 3 illustrates a typical sequence of signalling messages over the Gs interface, between a SGSN and a VLR using the BSSAP+ protocol. This sequence arises during a location update, e.g. when a mobile subscriber enters the coverage area of a new BSC, and comprises: a BSSAP+ Location Update Request sent from the SGSN to the VLR; a BSSAP+ Location Update Accept returned from the VLR to the SGSN; and a BSSAP+ TMSI reallocation complete message sent from the SGSN to the VLR.

SUMMARY OF THE PRESENT INVENTION

The inventor of the present invention has recognised that problems may arise when a mobile subscriber makes a new location update request whilst the system is still processing an earlier request. This situation may arise for example when the subscriber turns the power off on his mobile terminal whilst the system is processing a location update request, and is illustrated in FIG. 4.

Each GSM mobile subscriber is allocated an International Mobile Subscriber Identity (IMSI). This code is sent to the network from the subscriber's terminal during the registration process and is included in the BSSAP+ Location Update Request sent from the SGSN to the VLR. The IMSI is the only identity for making associations in the Gs interface. As such, neither the VLR nor the SGSN are able to know for certain to which transaction a message belongs. Current GSM specifications require the VLR to terminate an existing transaction in the event that another BSSAP+ Location Update Request is received containing the same IMSI as is present in the pre-existing transaction. As the delivery of messages takes a finite time, the SGSN is not able to know whether a received Location Update Accept message corresponds to the first or second Location Update Request message which the SGSN sent to the VLR. This is unfortunate, as the SGSN must act in different ways depending upon whether the Location Update Accept message relates to the first or the second Location Update Request. If the Location Update Accept message relates to the first Location Update Request, the message should be ignored by the SGSN, and the SGSN should wait for the second Location Update Accept message, otherwise it should proceed to act upon the Location Update Accept message. A consequence of the SGSN acting mistakenly on the first Location Update Accept message is that the SGSN may send an incorrect Temporary Mobile Subscriber Identity (TMSI) to a subscriber, resulting in the subscriber not being able to receive calls when the network is paging the subscriber with another TMSI.

It is an object of the present invention to overcome or at least mitigate the above noted disadvantages. It is a second object of the present invention to enable messages sent over a Gs interface to be identified with a particular transaction. These and other objects are achieved at least in part by incorporating a transaction identifier into BSSAP+ protocol messages or by appending such an identifier to these messages.

According to a first aspect of the present invention there is provided a method of sending BSSAP+ messages over the Gs interface between a Serving GPRS Support Node (SGSN) and a Visitor Location Register (VLR) of a GSM mobile telecommunications system, the method comprising incorporating into BSSAP+ messages, or appending thereto, an identifier which allows the messages to be associated with the transactions to which they relate.

As a Location Update Accept message will contain or be accompanied by the same identifier as the Location Update Request message to which it relates, the participating SGSN can unequivocally associate the two messages when the present invention is employed.

In certain embodiments of the present invention BSSAP+ messages may be encapsulated within TCAP messages prior to further encapsulation within SCCP messages. In this case, said identifier is a sequence number (transaction ID) which is included in the TCAP message header at the signalling point which initiates the transaction.

In other embodiments of the present invention, the BSSAP+ protocol message structure is modified to allow for the inclusion of a sequence number into BSSAP+ messages. A signalling point receiving a message includes the received sequence number in any response message.

According to a second aspect of the present invention there is provided a Serving GPRS Support Node (SGSN) or a Visitor Location Register (VLR) for use in a GSM mobile telecommunications network, the SGSN or VLR comprising:

processing means arranged in use to incorporate into BSSAP+ messages, or append thereto, an identifier which allows the messages to be associated with the transactions to which they relate; and transmission means for causing said BSSAP+ messages, incorporating said identifier or having said identifier appended thereto, to be transmitted to a peer SGSN or VLR over an intervening Gs interface.

In certain embodiments of the above second aspect of the invention, said processing means is arranged to implement the TCAP protocol wherein sequence numbers are included in a header of the TCAP messages.

In other embodiments of the above second aspect of the invention, said processing means is arranged to implement the BSSAP+ protocol wherein sequence numbers are incorporated into the BSSAP+ messages.

DETAILED DESCRIPTION OF PREFERRED EMBODIMENTS

Figure 1:
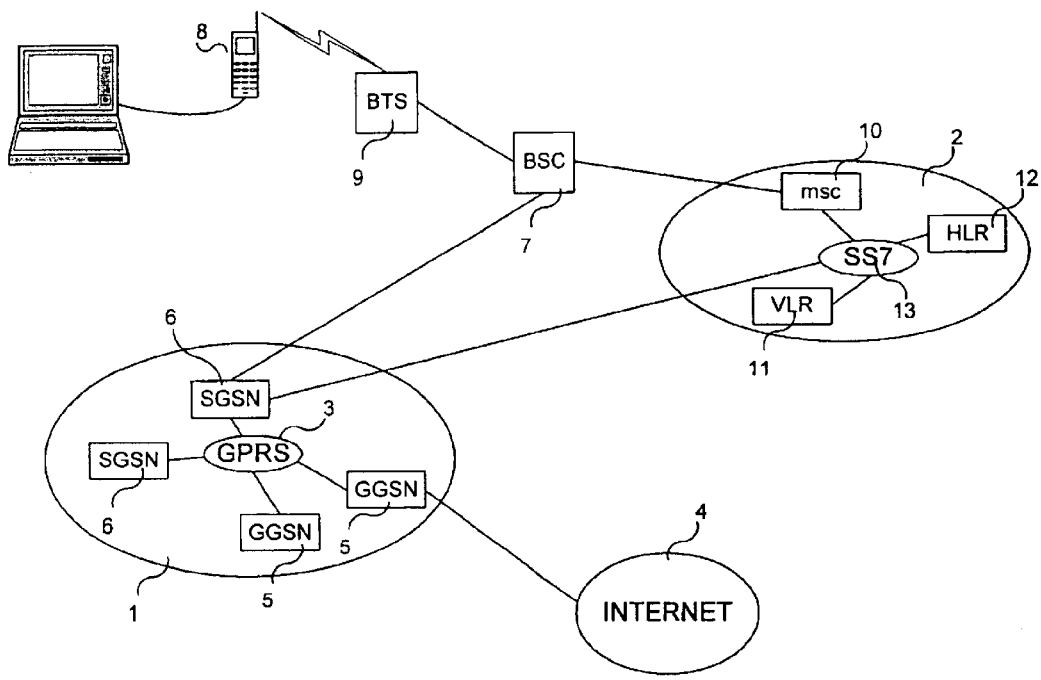
FIG. 1 illustrates schematically a mobile telecommunications system.

The introduction of GPRS into GSM mobile telecommunications networks has already been described above with reference to FIG. 1. Problems arising from location update have also been described with reference to FIGS. 1 to 3. The solution to those problems presented here relies upon attaching a transaction identifier to BSSAP+ messages sent over a Gs interface.

Figure 5:
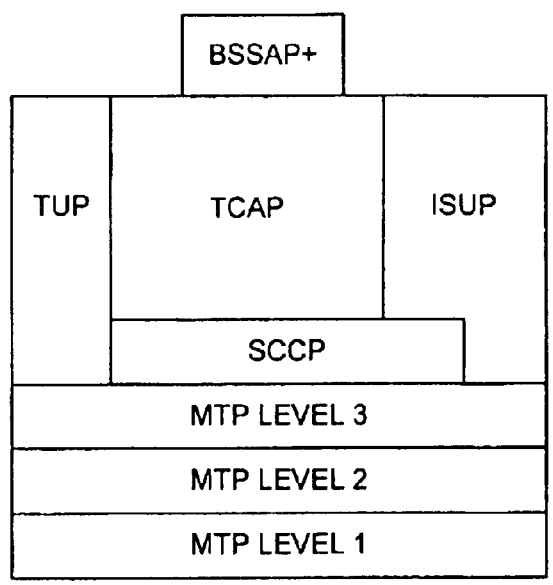
FIG. 5 illustrates a modified signalling protocol stack.

FIG. 5 illustrates a modified protocol stack which is provided at a signalling point of a GSM Phase 2 system. In the present example, the signalling point is a SGSN. It will be noted from FIG. 5 that the BSSAP+ protocol layer is located directly on top of the TCAP layer which is in turn located on top of the SCCP layer. In the event that the BSSAP+ layer initiates a transaction such as a location update transaction, the message primitive corresponding to the Location Update Request generated by the BSSAP+ layer (including the IMSI, etc) is encapsulated by the TCAP layer into the component portion of an appropriate TCAP message. The TCAP layer also generates a unique Originating Transaction ID which is the next number in a sequence of numbers maintained by the TCAP layer. This number is unique to the new transaction and is included in a transaction portion of the TCAP message, with the TCAP message subsequently being encapsulated in an SCCP message which is sent to a peer SCCP layer at the VLR.

Upon receipt of the SCCP message at the peer SCCP layer of the VLR, the TCAP message is extracted and the Originating Transaction ID identified. An appropriate TCAP process is created which identifies that the message is intended for the BSSAP+ layer. The TCAP process identifies the Originating Transaction ID and stores this to memory. A local TCAP process ID is associated with the process and therefore with the stored Originating Transaction ID. The TCAP process notifies the BSSAP+ layer of the receipt of the message and also of the local TCAP process ID. In response, a BSSAP+ process is initiated.

Assuming that the BSSAP+ layer accepts the request (and carries out the necessary updates to its register), the BSSAP+ layer generates a message primitive corresponding to a Location Update Accept message. The primitive includes a TMSI allocated to the subscriber associated with the Location Update Request. The BSSAP+ layer then passes the local TCAP process ID to the TCAP layer to alert the waiting TCAP process. The local BSSAP+ process ID, associated with the BSSAP+ process, is also passed to the TCAP layer. The TCAP layer encapsulates the Location Update Accept in the component part of a TCAP message and includes the Originating Transaction ID in the transaction part.

The TCAP message containing the Location Update Accept message and encapsulated in an SCCP message is then sent from the VLR to the originating SGSN. Following the decapsulation of the Accept message, the SGSN notifies the subscriber of the allocated TMSI. The SGSN then returns a BSSAP+TMSI reallocation complete message (encapsulated in a TCAP and an SCCP message) to the VLR. The transaction part of the TCAP message again contains the Originating Transaction ID already allocated to this Location Update transaction. Using the Originating Transaction ID, the associated local TCAP process ID and the BSSAP+ process ID can be found, enabling the BSSAP+ process to be completed and terminated.

In an alternative embodiment, the Originating Transaction ID itself may be exchanged between the TCAP and BSSAP+ layers at the VLR (and subsequently at the SGSN) thus allowing the correct association of Gs BSSAP+ messages.

Figure 6:
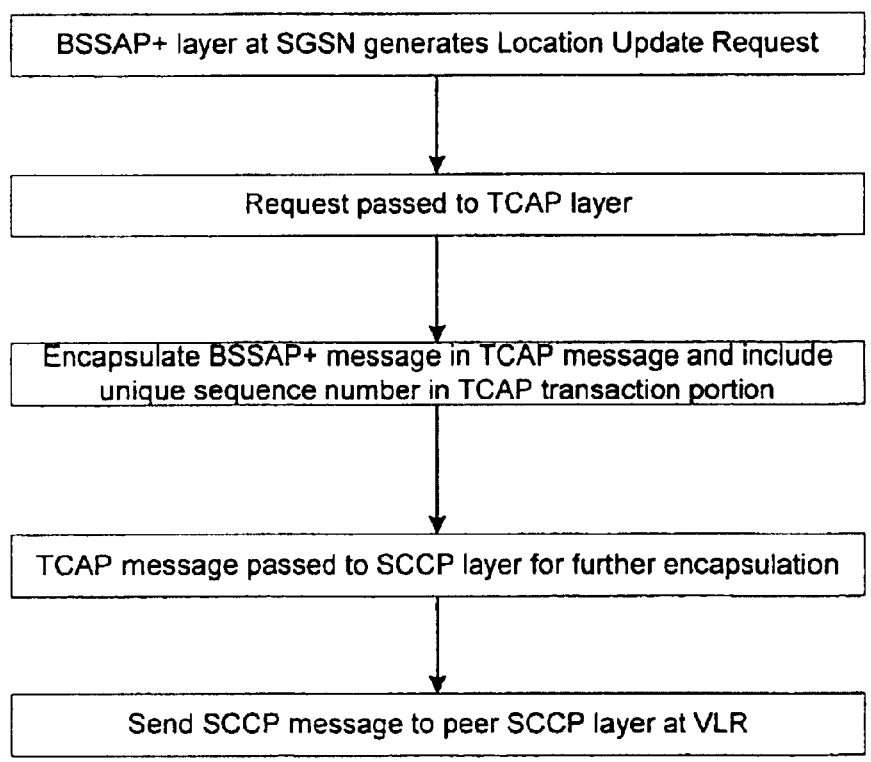
FIG. 6 is a flow diagram illustrating a method.

The first part of the Location Update transaction (SGSN to VLR) described above is further illustrated by the flow diagram of FIG. 6.

Figure 2:
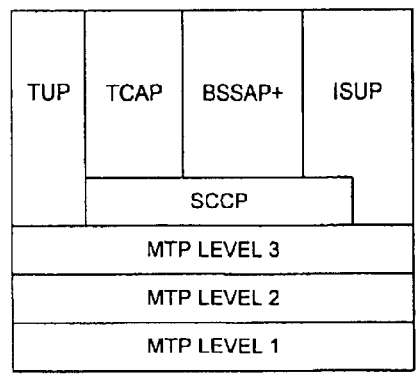
FIG. 2 illustrates the protocol stack of an SS7 network.
Figure 3:
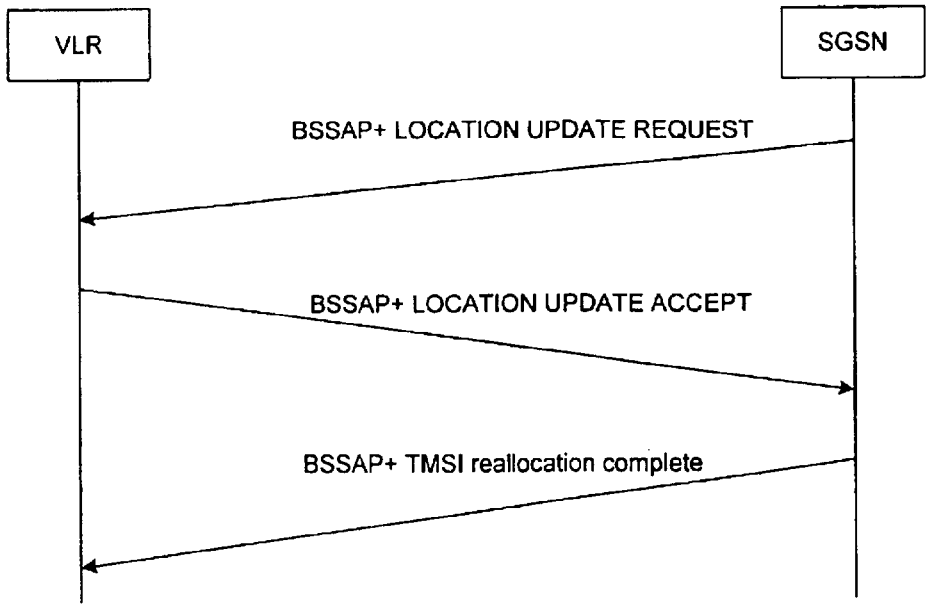
FIG. 3 illustrates the signalling associated with a location update transaction in the system of FIG. 1.
Figure 4:
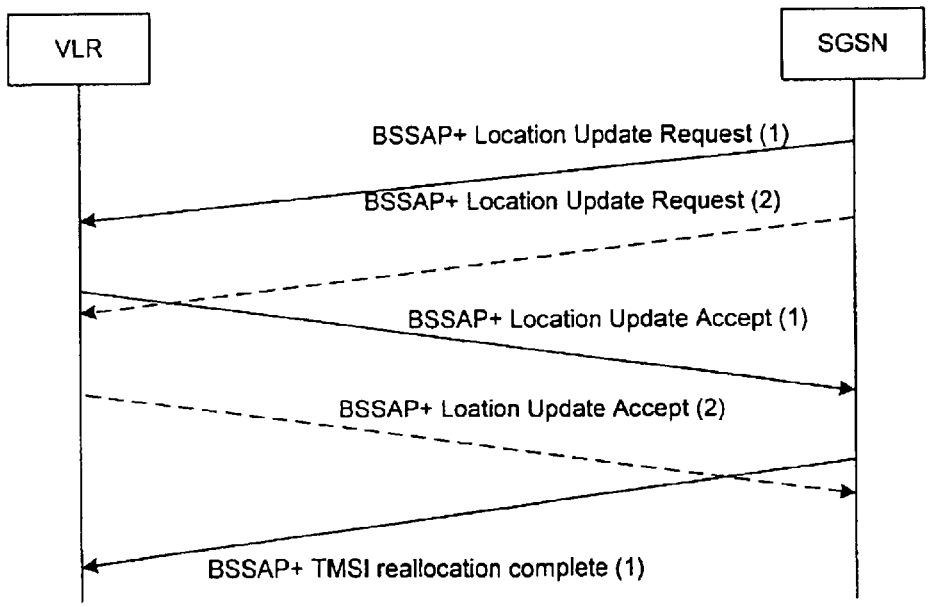
FIG. 4 illustrates the signalling associated with two successive location update transactions in the system of FIG. 1.

As an alternative to modifying the overall structure of the protocol stack, it is possible to retain the structure of FIG. 2 and to instead modify the BSSAP+ protocol to make provision for adding sequence numbers to Location Update transaction at the BSSAP+ level. Each time a new transaction is commenced, e.g. by a mobile subscriber entering a cell of a mobile network, a new sequence number is allocated at the BSSAP+ layer of the SGSN and is included in a header part of the BSSAP+ Location Update Request message (which is encapsulated in a SCCP message but not a TCAP message). The sequence number is remembered at the peer BSSAP+ layer of the VLR with which the SGSN communicates. The number is included in the returned SCCP encapsulated BSSAP+ Location Update Accept message and again in the TMSI reallocation complete message. An advantage of this approach is that only a modification to the BSSAP+ protocol is required and there is no requirement to reorder the overall protocol stack structure.

It will be appreciated by the person of skill in the art that various modifications may be made to the above described embodiment without departing from the scope of the present invention.

What is claimed is:

1. A method of sending Base Station System Application Part+ (BSSAP+) messages over the Gs interface between a Serving GPRS Support Node (SGSN) and a Visitor Location Register (VLR) of a Global System for Mobile Communications (GSM) mobile telecommunications system, the method comprising:

the Transaction Capabilities Application Part (TCAP) protocol layer encapsulating into a TCAP message at said SGSN, a message primitive received from the BSSAP+ protocol layer corresponding to a location update request;

generating a unique identification (ID) number and including said unique ID number in said TCAP message;

sending said TCAP message to said Visitor Location Register;

extracting said TCAP message at said VLR and identifying said unique ID number;

associating a local TCAP process ID with said unique ID number;

encapsulating a location update accept message in a return TCAP message including the unique ID number; and sending said return TCAP message from the VLR to said SGSN.

2. The method according to claim 1, further comprising:

encapsulating said TCAP message into an SCCP message; and sending said SCCP message via a peer SCCP layer to said VLR.

3. A method according to claim 1 further comprising:

said local TCAP process notifying the BSSAP+ layer of receipt of said TCAP message;

passing the local TCAP process ID and the local BSSAP+ process ID to the TCAP layer; and said BSSAP+ layer generating a message primitive corresponding to a location update accept message wherein said message primitive includes a Temporary Mobile Station Identifier (TMSI) allocated to a subscriber associated with the location update request.

4. The method according to claim 1, wherein the BSSAP+ protocol message structure allows for the inclusion of said unique ID number into BSSAP+ messages and said unique ID number is allocated by a signalling point that initiates the transaction.

5. A Serving GPRS Support Node (SGSN) or a Visitor Location Register (VLR) for use in a GSM mobile telecommunications network, the SGSN and the VLR each comprising:

processing means for:

encapsulating into a Transaction Capabilities Application Part (TCAP) protocol layer message, a message primitive received from the BSSAP+ protocol layer corresponding to a location update request;

generating a unique identification (ID) number and including said unique ID number in said TCAP message; and transmission means for sending said TCAP message to a Visitor Location Register (VLR); and second processing means at said VLR for:

extracting said TCAP message at said VLR and identifying said unique ID number;

associating a local TCAP process ID with said unique ID number;

encapsulating a location update accept message in a return TCAP message including the unique ID number; and sending said return TCAP message from said VLR to said SGSN.

6. The processor of claim 1 wherein said processor further comprises:

encapsulating said TCAP message into an SCCP message; and sending said SCCP message via a peer SCCP layer to said VLR.

7. The second processor of claim 5, said second processor comprising:

means for said local TCAP process to notify the BSSAP+ layer of receipt of said TCAP message;

means for passing the local TCAP process ID and the local BSSAP+ process ID to the TCAP layer; and means for generating a message primitive corresponding to a location update accept message wherein said message primitive includes a Temporary Mobile Station Identifier (TMSI) allocated to a subscriber associated with the location update Request.

* * * * *